USO10361602B2

(12) United States Patent
Wu et al.

(10) Patent No.: US 10,361,602 B2
(45) Date of Patent: Jul. 23, 2019

(54) STAINLESS STEEL MOTOR WITH HIGH WEATHER RESISTANCE AND HIGH SEALING PERFORMANCE

(71) Applicant: ZHEJIANG DONGXIN ITECHNOLOGY CO., LTD., Zhuji (CN)

(72) Inventors: Guoyao Wu, Shaoxin (CN); Dong Chen, Shaoxin (CN); Fengping Zhou, Shaoxin (CN)

(73) Assignee: Zhejiang Dongxin iTechnonlogy Co., Ltd., Zhuji (CN)

( * ) Notice: Subject to any disclaimer, the term of this patent is extended or adjusted under 35 U.S.C. 154(b) by 450 days.

(21) Appl. No.: 15/311,916

(22) PCT Filed: May 18, 2015

(86) PCT No.: PCT/CN2015/079231
§ 371 (c)(1),
(2) Date: Jan. 12, 2017

(87) PCT Pub. No.: WO2015/176634
PCT Pub. Date: Nov. 26, 2015

(65) Prior Publication Data
US 2017/0117770 A1    Apr. 27, 2017

(30) Foreign Application Priority Data

May 17, 2014 (CN) .......................... 2014 1 0209825
May 17, 2014 (CN) ..................... 2014 2 0253966 U

(51) Int. Cl.
H02K 5/02    (2006.01)
H02K 5/04    (2006.01)
(Continued)

(52) U.S. Cl.
CPC ................. *H02K 5/10* (2013.01); *H02K 5/02* (2013.01); *H02K 5/04* (2013.01); *H02K 5/124* (2013.01); *H02K 5/20* (2013.01); *H02K 5/225* (2013.01)

(58) Field of Classification Search
CPC .. H02K 5/02; H02K 5/10; H02K 5/12; H02K 5/124; H02K 5/132; H02K 5/20; H02K 5/22; H02K 5/225
(Continued)

(56) References Cited

U.S. PATENT DOCUMENTS 3,638,055 A  *  1/1972  Zimmermann ........ H02K 5/128
                                                        264/272.19
4,700,093 A  * 10/1987  Negishi .................... H02K 5/12
                                                        310/410
(Continued)

FOREIGN PATENT DOCUMENTS

CN        2140111 Y      8/1993
CN     201075754 U       6/2008
(Continued)

OTHER PUBLICATIONS

International Search Report of PCT Patent Application No. PCT/CN2015/079231 dated Aug. 17, 2015.

*Primary Examiner* — Quyen P Leung
*Assistant Examiner* — Minki Chang
(74) *Attorney, Agent, or Firm* — NK Patent Law

(57) ABSTRACT

A stainless steel motor with high weather resistance and high sealing performance comprises a cylindrical housing (11) made of a stainless steel material. A front end cover (12) is arranged at one end of the cylindrical housing, and a rear end cover (13) is arranged at the other end of the cylindrical housing. A rotary shaft hole (12a) is provided in the front end cover. A rotary shaft sealing sleeve (12b) is arranged in the rotary shaft hole, and a rotor shaft (12) is sleeved in the (Continued)

rotary shaft sealing sleeve (12b). A first drainage structure is arranged on the front end cover, and a second drainage structure is arranged on the rear end cover. A first wire penetrating hole (11a) and a second wire penetrating hole (11b) are provided in the cylindrical housing. A junction box (3) located on the outside of the first wire penetrating hole and a capacitor box (4) provided with a capacitor (4a) and located on the outside of the second wire penetrating hole are arranged on the outer wall of the cylindrical housing. A first sealing structure is arranged between the cylindrical housing and the junction box, and a second sealing structure is arranged between the cylindrical housing and the capacitor box. The motor has the advantages of easy draining and good sealing effect.

10 Claims, 3 Drawing Sheets

(51) Int. Cl.
H02K 5/10 (2006.01)
H02K 5/20 (2006.01)
H02K 5/22 (2006.01)
H02K 5/124 (2006.01)

(58) Field of Classification Search
USPC .................................. 310/43, 71, 88, 89
See application file for complete search history.

(56) References Cited

U.S. PATENT DOCUMENTS

| | | | |
|---|---|---|---|
| 7,042,124 B2* | 5/2006 | Puterbaugh | H02K 5/10 |
| | | | 310/43 |
| 2014/0361643 A1* | 12/2014 | Kamiya | H02K 5/08 |
| | | | 310/43 |
| 2015/0244242 A1* | 8/2015 | Okano | H02K 5/225 |
| | | | 310/54 |

FOREIGN PATENT DOCUMENTS

| CN | 201393115 Y | 1/2010 |
|---|---|---|
| CN | 202034844 U | 11/2011 |
| CN | 202651954 U | 1/2013 |
| CN | 103997151 A | 8/2014 |
| CN | 203859601 U | 10/2014 |

* cited by examiner

STAINLESS STEEL MOTOR WITH HIGH WEATHER RESISTANCE AND HIGH SEALING PERFORMANCE

TECHNICAL FIELD

The present invention belongs to the technical field of motors, and relates to a stainless steel motor with high weather resistance and high sealing performance.

DESCRIPTION OF THE RELATED ART

Motors require high sealing performance when used outdoors or used in environments with high humidity. When having high sealing performance, motors have a long service life and high operating stability. Restrained by the service environment, existing motors with high weather resistance have poor sealing performance and short service life. Therefore, after years of studying, researchers have put forward various solutions. A Chinese patent discloses a motor sealing structure [Filing No.: 201220306112.6], comprising a front end cover, a rear end cover and a protective hood; the joint between the front end cover and the rear end cover is provided with sealing rings; and the front end cover and the rear end cover are fixed with bolts. Single-phase motors with centrifugal switches generally employ centrifugal hammers made of #45 steel materials and springs which determine the opening and closing of the centrifugal hammers. In cases where chemical pumps, high-pressure pumps for washing machines, equipment easily corroded by seawater, etc., are used, the service life of the motors depends on the service life of the springs. If the springs are broken or do not work because of corrosion, the motors cannot be started and will be burnt because large currents remain. The application of stainless steel centrifugal switches has not been seen in any report yet.

In the above solution, the sealing rings are disposed between the front end cover and the rear end cover of the motor, and the connecting faces of the front end cover and the rear end cover are respectively provided with semi-sealing ring slots for placing sealing rings, thereby enhancing the sealing performance of the motor. However, the solution has at least the following defects: the whole machine has poor sealing performance, in particular the wire outlet of the motor; besides, some motors are placed outdoors or in environments with high humidity, motors are usually invaded by water or condensate water is generated in the motors during use, and if the water in the motors cannot be drained in time, the motor may malfunction or become burnt.

DETAILED CONTENTS OF THE INVENTION

Aiming at the above problems, the present invention provides a stainless steel motor which has high sealing performance, high weather resistance, and carries out drainage easily.

In order to achieve the above objectives, the present invention employs the following technical solution. A stainless steel motor with high weather resistance and high sealing performance includes a motor casing; the motor casing is internally provided with a stator and a rotor shaft which penetrates the stator; the rotor shaft is fixed with a rotor; and the rotor shaft and the motor casing are axially positioned and are in circumferential rotating connection. The motor casing includes a cylindrical housing made of stainless steel materials. The cylindrical housing is provided with a front end cover at one end and a rear end cover made of aluminum materials at the other end. The stator is disposed at the inner wall of the cylindrical housing. Two ends of the rotor shaft respectively penetrate the front end cover and the rear end cover. The front end cover is provided with a rotary shaft hole. A rotary shaft sealing sleeve in which the rotor shaft is sleeved is disposed in the rotary shaft hole. The front end cover is provided with a first drainage structure. The rear end cover is provided with a second drainage structure. The cylindrical housing is provided with a first wire hole and a second wire hole. A junction box, which is positioned on the outer side of the first wire hole, and a capacitor box, which contains a capacitor and is positioned on the outer side of the second wire hole, are disposed at the outer wall of the cylindrical housing. A first sealing structure is disposed between the cylindrical housing and the junction box. A second sealing structure is disposed between the cylindrical housing and the capacitor box.

In the present application, due to the configuration of the first sealing structure and the second sealing structure, the sealing performance of the wire outlet of the motor casing can be improved. Besides, the cylindrical housing and the front end cover are in threaded connection and the connecting screw threads are coated with sealing glue; the cylindrical housing and the rear end cover are in threaded connection and the connecting screw threads are coated with sealing glue, so the rotary shaft sealing sleeve can guarantee the sealing performance of the rotor shaft in the rotating or motionless state, not only prolonging the service life of the motor, but also generating a simple structure which is easily assembled and manufactured. The first drainage structure and the second drainage structure provided play the role of draining water in the motor after the installation angle of the motor changes, thus ensuring the practicability and service life of the motor.

In the stainless steel motor with high weather resistance and high sealing performance, the first sealing structure includes a junction box sealing gasket disposed between the cylindrical housing and the junction box; the junction box sealing jacket has a first arc-shaped sealing face on one side close to the cylindrical housing; first arc-shaped sealing face fits the outer wall of the cylindrical housing; and the junction box sealing gasket and the junction box are connected in a sealing way through a horizontal sealing structure. The horizontal sealing structure includes a first horizontal sealing face disposed at the junction box sealing gasket, and the junction box is provided with a second horizontal sealing face which can fit the first horizontal sealing face at the bottom.

In the stainless steel motor with high weather resistance and high sealing performance, the second sealing structure includes a capacitor box sealing gasket disposed between the cylindrical housing and the capacitor box; the capacitor box sealing jacket has a second arc-shaped sealing face, which fits the outer wall of the cylindrical housing, on one side close to the cylindrical housing; and the capacitor box and the capacitor box sealing gasket are connected in a sealing way through an arc-shaped sealing structure. The arc-shaped sealing structure includes an outer arc-shaped sealing face disposed at the capacitor box sealing gasket, and an open end of the capacitor box has an arc-shaped cover face which fits the outer arc-shaped sealing face.

In the stainless steel motor with high weather resistance and high sealing performance, the first drainage structure includes a plurality of first horizontal drain holes which are disposed on a lateral ring of the front end cover; the front end cover is provided with a plurality of vertical drain holes at the bottom; the second structure includes a plurality of second horizontal drain holes which are disposed on a lateral ring of the rear end cover; the rear end cover is provided with a plurality of second vertical drain holes; the first horizontal drain holes, the first vertical drain holes, the second horizontal drain holes and the second vertical drain holes are respectively fixed with a drain hole choke plug; each of the drain hole choke plugs is provided with connecting screw threads and the connecting screw threads are coated with sealing glue. A ring slot and an O-shaped sealing ring disposed on the ring slot are disposed at the middle part of the drain hole choke plug. Besides, the first horizontal drain holes, the first vertical drain holes, the second horizontal drain holes and the second vertical drain holes can ensure that the motor meets installation requirements at all angles, further improving the practicability of the motor and draining water in the motor in time.

In the stainless steel motor with high weather resistance and high sealing performance, the cylindrical housing is formed by cutting out a circumferentially sealed stainless steel tubular profile; the front end cover and the rear end cover are fixed at two ends of the cylindrical housing through a plurality of connecting rods; the cylindrical housing is provided with cells, which are penetrated by the connecting rods, at the inner wall along the axial direction; and the cells are respectively formed by cutting out a slot which is provided with a profiled stainless steel tubular inner wall.

The cylindrical housing made by cutting out a circumferentially closed stainless steel tubular profile has the following advantages: 1. The circumferentially closed stainless steel tubular profile is an integrated structure, and then can be cut out to directly form the cylindrical housing in the present application; the structure not only ensures the structural strength but also enhances the productivity, so the stainless steel motor with high weather resistance and high sealing performance is more obviously easily processed and fabricated; 2. The circumferentially closed stainless steel tubular profile is usually fabricated by rolling or extrusion, and tubular profiles made by a rolling or extruding process have a stable quality, so the present application obviously improves the quality of the cylindrical housing. 3. The production cost is reduced; specifically, the present application has a very high utilization rate of the raw materials; then, during the fabrication process, the energy consumed is very low; in addition, the cylindrical housing of the present application can be made by just cutting out the stainless steel tubular profile, so there are few procedures, and the production cost is reduced. 4. The cells are structures respectively formed by cutting out the slot which is provided with the profiled stainless steel tubular inner wall, and is manufactured while the stainless steel tubular profile is rolled or extruded, thus ensuring the product quality of the cylindrical housing of the present application, avoiding processing errors caused by secondary processing, and ensuring the consistency of products.

In the stainless steel motor with high weather resistance and high sealing performance, the junction box sealing gasket and the capacitor box sealing gasket are both made of silica gel.

In the stainless steel motor with high weather resistance and high sealing performance, one end of each of the connecting rods is in threaded connection with the front end cover, while the other end is provided with an end cap which is disposed at the outer wall of the bottom of the rear end cover; each of the connecting rods is sleeved with a thermal shrinkable tube and a sealing washer which is disposed between a corresponding end cap and the outer wall of the bottom of the rear end cover.

In the stainless steel motor with high weather resistance and high sealing performance, the second wire hole is provided with a wire-out plug; the capacitor box sealing gasket is formed with a wire hole which corresponds to the second wire hole and is inserted by the wire-out plug; a conical sealing structure is disposed between the capacitor box sealing gasket and the wire-out plug; the capacitor box sealing gasket is provided with a capacitor fixing fork holder; and the capacitor is fixed at the capacitor fixing fork holder. The capacitor fixing fork holder is made of Buna-n rubber. The conical structure includes an outer annular tapered face disposed at the wire-out plug, and the second wire hole is internally provided with an inner annular tapered face which fits the outer annular tapered face. A circumferential positioning structure for preventing the circumferential rotation of the capacitor box sealing gasket and the capacitor box is disposed between the capacitor box sealing gasket and the capacitor box; the circumferential positioning structure includes a plurality of notches which are disposed on circumferential sides of the capacitor box sealing gasket; and a plurality of screws disposed at the capacitor box pass through the notches and are connected with the cylindrical housing.

In the stainless steel motor with high weather resistance and high sealing performance, the rear end cover is internally provided with a centrifugal switch board and a centrifugal switch disposed on the centrifugal switch board; the rotor shaft is provided with a centrifuge at one end close to the rear end cover; the centrifuge can drive the centrifugal switch to close; and when the centrifuge is performing centrifugation, the centrifuge drives the centrifugal switch to open; and a concession hole through which the rotor shaft passes is disposed in the central area of the centrifugal switch board. The centrifuge is of a prior art, and therefore is not described in further detail. The centrifugal switch board in the present application is made of stainless steel materials, not only having a long service life, but also barely rusting.

In the stainless steel motor with high weather resistance and high sealing performance, the centrifugal switch is made of stainless steel plates, and the centrifugal switch board is fixed at the rear end cover through a plurality of connecting columns. The connecting columns can be made of engineering plastics or metallic materials.

In the stainless steel motor with high weather resistance and high sealing performance, the rear end cover is provided with a plurality of inward recessing mounting bosses; the connecting rods correspond to the mounting bosses one by one and pass through the corresponding mounting bosses; the junction box comprises a stainless steel junction box base and a stainless steel junction cover fastened to the stainless steel junction box case; a junction box sealing ring is disposed between the stainless steel junction box base and the stainless steel junction cover; and the stainless steel junction box base is formed with a wire-wire hole and a wire-out plug disposed on the wire-out hole. The structure plays the role of enhancing the assembling efficiency of the motor and improving the sealing performance and practicability of the junction box. The wire-out plug is made from Buna-N rubber.

In the stainless steel motor with high weather resistance and high sealing performance, annular rings are respectively fixed at the two ends of the rotor 23; a plurality of circumferentially distributed plates are respectively disposed at one end of each of the annular rings away from the rotor; and, the annular rings and the plates are connected integrally. The annular rings and the rotor are circumferentially connected through a plurality of dwell pins.

Compared with the prior art, the present invention has the following advantages: 1. Excellent sealing performance: due to the configuration of the first sealing structure and the second sealing structure, the sealing performance of the wire outlet of the motor casing can be improved; besides, the cylindrical housing and the front end cover are in threaded connection and the connecting screw threads are coated with sealing glue; the cylindrical housing and the rear end cover are in threaded connection and the connecting screw threads are coated with sealing glue, so the rotary shaft sealing sleeve can guarantee the sealing performance of the rotor shaft in the rotating or motionless state, not only prolonging the service life of the motor, but also generating a simple structure which is easily assembled and manufactured. The first drainage structure and the second drainage structure provided play the role of draining water in the motor after the installation angle of the motor changes, thus ensuring the practicability and service life of the motor. 2. The manufacturing cost is low and the assembling is easy. 3. The cylindrical housing is made by cutting out the circumferentially closed stainless steel tubular profile, not only enhancing the productivity, but also ensuring the structural strength of the whole machine and preventing rusting.

DESCRIPTION OF SEVERAL VIEWS OF THE ATTACHED DRAWINGS

Figure 1:
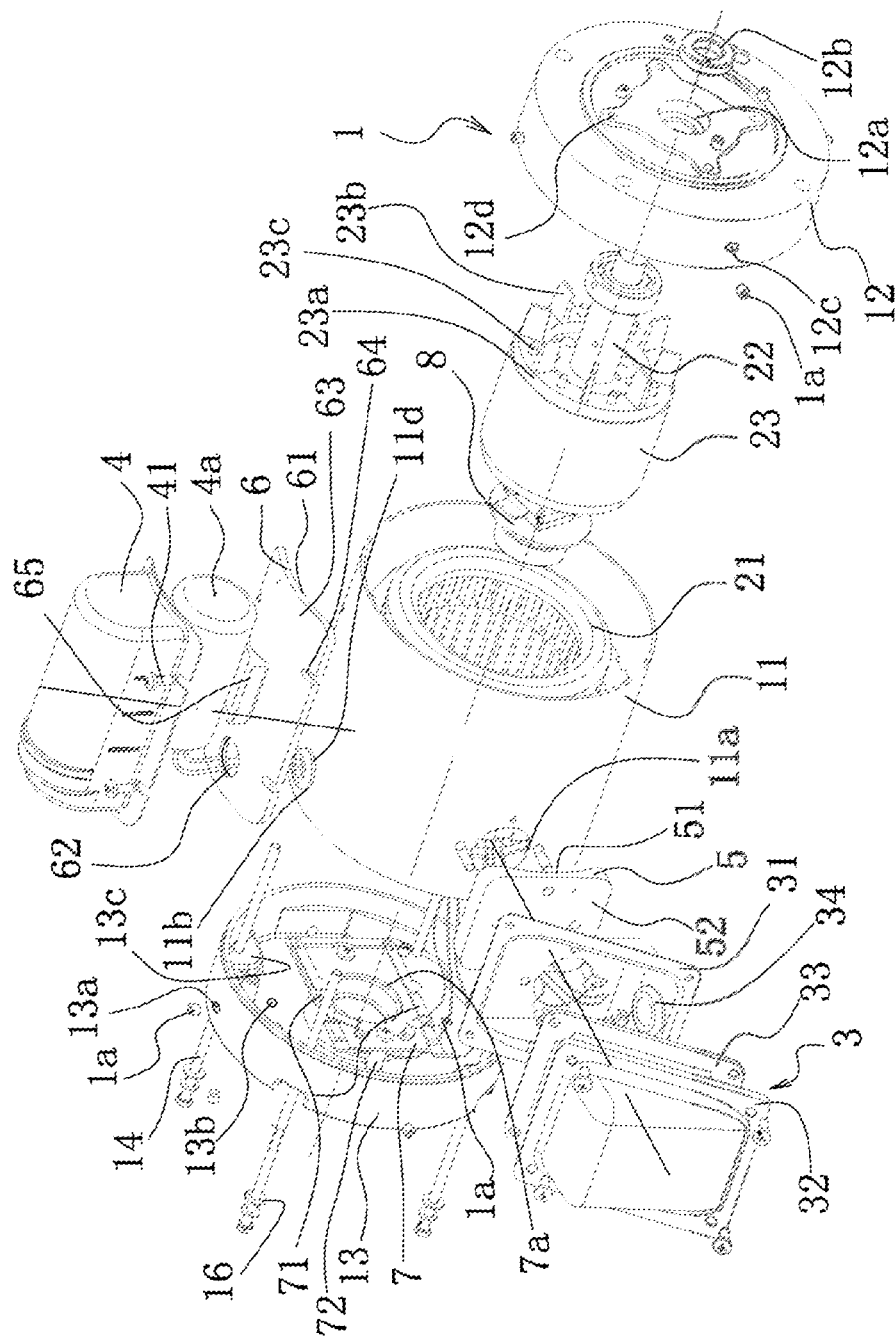
FIG. 1 is an exploded structural view of the present invention.
Figure 2:
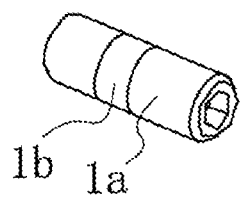
FIG. 2 is a structural view of a drain hole choke plug of the present invention.
Figure 3:
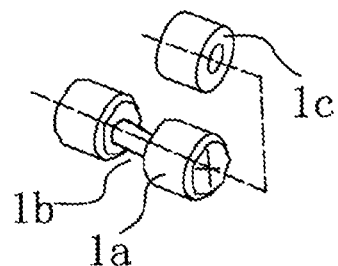
FIG. 3 is an exploded structural view of the drain hole choke plug of the present invention.

In the Figures: motor casing 1, drain hole choke plate 1a, ring slot 1b, o-shaped sealing ring 1c, cylindrical housing 11, first wire hole 11a, second wire hole 11b, cell 11c, wire-out plug 11d, front end cover 12, rotary shaft hole 12a, rotary shaft sealing sleeve 12b, first horizontal drain hole 12c, first vertical drain hole 12d, rear end cover 13, second horizontal drain hole 13a, second vertical drain hole 13b, mounting boss 13c, connecting rod 14, end cap 14a, thermal shrinkable tube 15, sealing washer 16, stator 21, rotor shaft 22, rotor 23, junction box 3, stainless steel junction box base 31, stainless steel junction cover 32, junction box sealing ring 33, wire-out plug 34, capacitor box 4, capacitor 4a, screw 41, junction box sealing gasket 5, first arc-shaped sealing face 51, second horizontal sealing face 52, capacitor box sealing gasket 6, second arc-shaped sealing face 61, wire hole 62, outer arc-shaped sealing face 63, notch 64, capacitor fixing fork holder 65, centrifugal switch board 7, concession hole 7a, centrifugal switch 71, connecting column 72, centrifuge 8.

DETAILED DESCRIPTION OF THE PRESENT INVENTION

The present invention is described in further detail with reference to the attached drawings and embodiments.

As shown in FIG. 1, a stainless steel motor with high weather resistance and high sealing performance includes a motor casing 1; the motor casing 1 is internally provided with a stator 21 and a rotor shaft 22 which penetrates the stator 21; the rotor shaft 22 is fixed with a rotor 23; and the rotor shaft 22 and the motor casing 1 are axially positioned and are in circumferential rotating connection.

Figure 6:
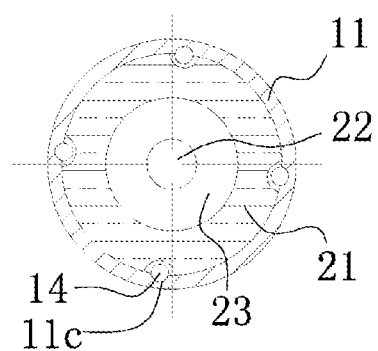
FIG. 6 is a transverse sectional structural view of the present invention.
Figure 7:
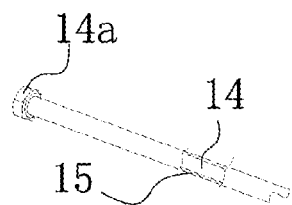
FIG. 7 is a structural view of a connecting rod of the preset invention.

In an optimized solution, as shown in FIG. 1, FIG. 6 and FIG. 7, the motor casing 1 in the embodiment includes a cylindrical housing 11 made of stainless steel materials. The stainless steel materials solve the problems of heavy weight and the tendency of rusting of previous motor casings made by various means such as casting. The cylindrical housing 11 is provided with a front end cover 12 made of aluminum materials at one end and a rear end cover 13 made of aluminum materials. The aluminum materials are aluminum alloys which are light in weight and low in manufacturing cost, and capable of being manufactured by pressure casting or pouring casting. The cylindrical housing 11 is made by cutting out circumferentially closed stainless steel tubular profiles. By cutting out circumferentially closed stainless steel tubular profiles to make the cylindrical housing 11, the production efficiency can be enhanced, and the structural strength of the whole machine can be guaranteed. Besides, the cylindrical housing has high sealing performance and dose not tend to rust. The front end cover 12 and the rear end cover 13 are fixed at two ends of the cylindrical housing 11 through a plurality of connecting rods 14; the cylindrical housing 11 is internally provided with a plurality of cells 11c, which are penetrated by the connecting rods 14, at the inner wall along the axial direction; the cells 11 are respectively formed by cutting a slot which is provided with a profiled stainless steel inner wall; recession grooves corresponding to the cells 11c one by one are disposed on a lateral portion of the stator 21.

Further, one end of each of the connecting rods 14 is in threaded connection with the front end cover 12, while the other end is provided with an end cap 14a which is disposed at the outer wall of the bottom of the rear end cover 13; each of the connecting rods 14 is sleeved with a thermal shrinkable tube 15 and a sealing washer 16 which is disposed between a corresponding end cap 14a and the outer wall of the bottom of the rear end cover 13; moreover, the rear end cover 13 is provided with a plurality of inward recessing mounting bosses 13c, and the connecting rods 14 correspond to the mounting bosses 13c one by one and pass through the corresponding mounting bosses 13c.

In order to enhance the sealing performance, as shown in FIG. 1, the stator 21 in the embodiment is disposed at the inner wall of the cylindrical housing 11; the two ends of the rotor shaft 22 respectively penetrate the front end cover 12 and the rear end cover 13; the rotor shaft 22 and the front end cover 12 are connected through a roller bearing; and the rotor shaft 22 and the rear end cover 13 are connected through a roller bearing. In order to further prolong the service life of the motor, annular rings 23a are respectively fixed at the two ends of the rotor 23; a plurality of circumferentially distributed plates 23b are respectively disposed at one end of each of the annular rings away from the rotor; the annular rings 23a and the rotor 23 are circumferentially connected through a plurality of dwell pins 23c; moreover, the annular rings and the plates are connected integrally. The front end cover 12 is formed with a rotary shaft hole 12a, and a rotary shaft sealing sleeve 12b which is sleeved on the rotor shaft 22 is disposed in the rotary shaft hole 12a. The front end cover 12 is provided with a first drainage structure, and the rear end cover 13 is provided with a second drainage structure. The cylindrical housing 11 is formed with a first wire hole 11a and a second wire hole 11b. A junction box 3, which is positioned on the outer side of the first wire hole 11a, and a capacitor box 4, which contains a capacitor 4a and is positioned on the outer side of the second wire hole 11b, are disposed at the outer wall of the cylindrical body 11. In an optimized solution, the junction box 3 in the embodiment include a stainless steel junction box base 31 and a stainless steel junction cover 32 fastened to the stainless steel junction box base 31; a junction box sealing ring 33 is disposed between the stainless steel junction box 31 and the stainless steel junction cover 32; the stainless steel junction box base 31 is provided with a wire-out hole and a wire-out plug 34 disposed at the wire-out hole; besides, a first sealing structure is disposed between the cylindrical housing 11 and the junction box 3, and a sealing structure is disposed between the cylindrical housing 11 and the capacitor box 4.

In an optimized solution, the first sealing structure in the embodiment comprises a junction box sealing gasket 5 disposed between the cylindrical housing 11 and the junction box 3; the junction box sealing gasket 5 has a first arc-shaped sealing face 51, which fits the outer wall of the cylindrical housing 11, on one side close to the cylindrical housing 11; the junction box sealing gasket 5 and the junction box 3 are connected in a sealing way through a horizontal sealing structure; specifically, the horizontal sealing structure includes a first horizontal sealing face 52 which is disposed at the junction box sealing gasket; and the junction box is provided with a second sealing horizontal face, which fits the first horizontal sealing face, at the bottom.

Besides, the second sealing structure includes a capacitor box sealing gasket 6 disposed between the cylindrical housing 11 and the capacitor 4; the capacitor box sealing gasket 6 is provided with a second arc-shaped sealing face 61, which fits the outer wall of the cylindrical housing 11, on one side close to the cylindrical housing 11; the capacitor box 4 and the capacitor box sealing gasket 6 are connected in a sealing way through an arc-shaped sealing structure; specifically, the arc-shaped sealing structure includes an outer arc-shaped sealing face 63 disposed at the capacitor box sealing gasket; and an open end of the capacitor box has an arc-shaped cover face which fits he outer arc-shaped sealing face.

Then, as shown in FIG. 1, the second wire hole 11b is provided with a wire-out plug 11d; the capacitor box sealing gasket 6 is formed with a wire hole 62 which corresponds to the second wire hole 11b and is inserted by the wire-out plug 11d; a conical sealing structure is disposed between the capacitor box sealing gasket 6 and the wire-out plug 11d; the conical structure includes an outer annular tapered face disposed at the wire-out plug; the second wire hole is internally provided with an inner annular tapered face which fits the outer annular tapered face; a capacitor fixing fork holder 65 is disposed on the capacitor box sealing gasket 6; and the capacitor 4a is fixed at the capacitor fixing fork holder 65. A circumferential positioning structure for preventing the circumferential rotation of the capacitor box sealing gasket 6 and the capacitor box 4 is disposed between the capacitor box sealing gasket 6 and the capacitor box 4; the circumferential positioning structure includes a plurality of notches 64 which are disposed on the circumferential sides of the capacitor box sealing gasket 6; and a plurality of screws 41 disposed at the capacitor box 4 pass through the notches and are connected with the cylindrical housing 11.

In an optimized solution, the first drainage structure in the embodiment includes a plurality of first horizontal drain holes 12c disposed on a lateral ring of the front end cover 12; the front end cover 12 is provided with a plurality of vertical drain holes 12d at the bottom; the second structure includes a plurality of second horizontal drain holes 13a which are disposed on a lateral ring of the rear end cover 13; the rear end cover 13 is provided with a plurality of second vertical drain holes 13b; the first horizontal drain holes 12c, the first vertical drain holes 12d, the second horizontal drain holes 13a and the second vertical drain holes 13b are respectively fixed with a drain hole choke plug 1a; each of the drain hole choke plugs 1a is provided with connecting screw threads and the connecting screw threads are coated with sealing glue.

In order to improve the sealing performance and further enhance the assembling efficiency, a ring slot 1b and an O-shaped sealing ring 1c disposed on the ring slot are disposed at the middle part of the drain hole choke plug 1a.

Figure 4:
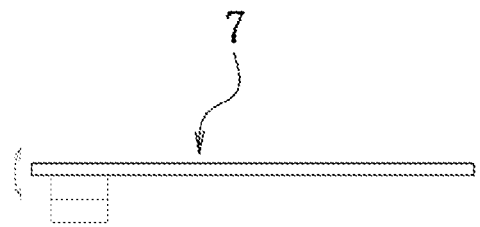
FIG. 4 is a state structural view of a centrifugal switch when a motor of the present invention is not started.
Figure 5:
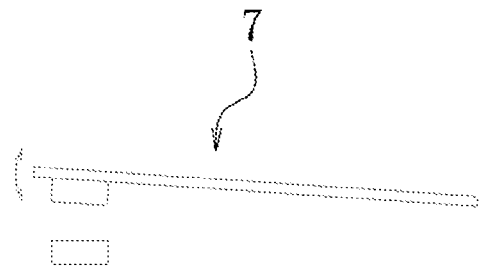
FIG. 5 is a state structural view of the centrifugal switch when the motor of the present invention reaches a certain rotating speed.

In an optimized solution, as shown in FIG. 1 and FIGS. 4-5, the rear end cover 13 in the embodiment is provided with a centrifugal switch board 7 and a centrifugal switch 71 disposed on the centrifugal switch board 7; the rotor shaft 22 is provided with a centrifuge 8, which drives the centrifugal switch 71 to close, at one end close to the rear end cover 13, and when the centrifuge 8 is performing centrifugation, the centrifuge 8 drives the centrifugal switch 71 to open; and a concession hole 7a through which the rotor shaft 22 passes is disposed in the central area of the centrifugal switch board 7. Specifically, the centrifugal switch board 7 is made of stainless steel plates, and the centrifugal switch board 7 is fixed at the rear end cover 13 through a plurality of connecting columns 72. When the centrifuge drives the centrifugal switch 71 to close, a static contact and a movable contact disposed on the centrifugal switch board 8 make contact with each other. In such circumstances, the motor is in the motionless state. When the rotating speed of the motor reaches a certain value, the centrifuge 8 drives the centrifugal switch 71 to open, which means that the static contact and the movable contact separate from each other. The static contact and the movable contact perform contact or separation by an elastic spring plate. The centrifuge 8 can drive the elastic plate to deform. The elastic plate is made of stainless steel materials.

In the embodiment, the junction box sealing gasket and the capacitor box sealing gasket can ensure the sealing performance of the lead outlet. By the structure formed through combination of the first arc-shaped sealing face which is disposed at the junction box sealing gasket and the second arc-shaped sealing face which is disposed on the capacitor box sealing gasket, the sealing performance can be further ensured. Besides, the structure provided with the rotary shaft sealing sleeve can ensure the sealing performance of the motor in the rotating state and in the motionless state. Moreover, the structure formed through combination of the first horizontal drain holes 12c, the first vertical drain holes 12d, the second horizontal drain holes 13a and the second vertical drain holes 13b can meet the use requirement that the motor can be used along with changes to the installation angle of the motor.

The specific embodiments described in the text are used for illustrating the principle of the present invention only. Those skilled in the field can make various amendments or supplementations or take similar substitutions on the basis of the described specific embodiments. The amendments, supplementations and substitutions shall fall within the principle or the protective scope claimed by the claims of the present invention.

Terms including the motor casing 1, drain hole choke plug 1a, ring slot 1b, O-shaped sealing ring 1c, cylindrical housing 11, first wire hole 11a, second wire hole 11b, cell 11c, wire-out plug 11d, front end cover 12, rotary shaft hole 12a, rotary shaft sealing sleeve 12b, first horizontal drain hole 12c, first vertical drain hole 12d, rear end cover 13, second horizontal drain hole 13a, second vertical drain hole 13b, mounting boss 13c, connecting rod 14, end cap 14a, thermal shrinkable tube 15, sealing washer 16, stator 21, rotor shaft 22, rotor 23, junction box 3, stainless steel junction box base 31, stainless steel junction cover 32, junction box sealing ring 33, wire-out plug 34, capacitor box 4, capacitor 4a, screw 41, junction box sealing gasket 5, first arc-shaped sealing face 51, first horizontal sealing face 52, capacitor box sealing gasket 6, second arc-shaped sealing face 61, wire hole 62, outer arc-shaped sealing face 63, notch 64, capacitor fixing fork holder 65, centrifugal switch board 7, concession hole 7a, centrifugal switch 71, connecting column 72 and centrifuge 8 are used many times in the text, but the possibility of using other terms is not excluded. The terms are only used for the purpose of more conveniently describing and explaining the essence of the present invention and interpretation of the terms as any one additional limit goes against the essence of the present invention.

The invention claimed is:

1. A stainless steel motor with high weather resistance and high sealing performance, comprising a motor casing, the motor casing being internally provided with a stator and a rotor shaft which penetrates the stator, the rotor shaft being fixed with a rotor, the rotor shaft and the motor casing being axially positioned and being in circumferential rotating connection, characterized in that, the motor casing comprises a cylindrical housing made of stainless steel materials; the cylindrical housing is provided a front end cover at one end and a rear end cover made of aluminum materials at the other end; the stator is disposed at the inner wall of the cylindrical housing; two ends of the rotor shaft respectively penetrate the front end cover and the rear end cover; a front end cover is provided with a rotary shaft hole; a rotary shaft sealing sleeve in which the rotor shaft is sleeved is disposed in the rotary shaft hole; the front end cover is provided with a first drainage structure; the rear end cover is provided with a second drainage structure; the cylindrical housing is provided with a first wire hole and a second wire hole; a junction box, which is positioned on the outer side of the first wire hole, and a capacitor box, which contains a capacitor and is positioned on the outer side of the second wire hole, are disposed at the outer wall of the cylindrical housing; a first sealing structure is disposed between the cylindrical housing and the junction box; and a second sealing structure is disposed between the cylindrical housing and the capacitor box.

2. The stainless steel motor with high weather resistance and high sealing performance according to claim 1, wherein the first sealing structure comprises a junction box sealing gasket disposed between the cylindrical housing and the junction box; the junction box sealing gasket has a first arc-shaped sealing face, which fits the outer wall of the cylindrical housing, on one side close to the cylindrical housing; and the junction box sealing gasket and the junction box are connected in a sealing way through a horizontal sealing structure.

3. The stainless steel motor with high weather resistance and high sealing performance according to claim 2, wherein the second sealing structure comprises a capacitor box sealing gasket disposed between the cylindrical housing and the capacitor box; the capacitor box sealing gasket has a second arc-shaped sealing face, which fits the outer wall of the cylindrical housing, on one side close to the cylindrical housing; and the capacitor box and the capacitor box sealing gasket are connected in a sealing way through an arc-shaped sealing structure.

4. The stainless steel motor with high weather resistance and high sealing performance according to claim 3, wherein the second wire hole is provided with a wire-out plug; the capacitor box sealing gasket is formed with a wire hole which corresponds to the second wire hole and is inserted by the wire-out plug; a conical sealing structure is disposed between the capacitor box sealing gasket and the wire-out plug; the capacitor box sealing gasket is provided with a capacitor fixing fork holder; and the capacitor is fixed at the capacitor fixing fork holder.

5. The stainless steel motor with high weather resistance and high sealing performance according to claim 1, wherein the first drainage structure comprises a plurality of first horizontal drain holes which are disposed on a lateral ring of the front end cover; the front end cover is provided with a plurality of vertical drain holes at the bottom; the second structure comprises a plurality of second horizontal drain holes which are disposed on a lateral ring of the rear end cover; the rear end cover is provided with a plurality of second vertical drain holes; the first horizontal drain holes, the first vertical drain holes, the second horizontal drain holes and the second vertical drain holes are respectively fixed with a drain hole choke plug; each of the drain hole choke plugs is provided with connecting screw threads and the connecting screw threads are coated with sealing glue.

6. The stainless steel motor with high weather resistance and high sealing performance according to claim 1, wherein the cylindrical housing is formed by cutting out a circumferentially sealed stainless steel tubular profile; the front end cover and the rear end cover are fixed at two ends of the cylindrical housing through a plurality of connecting rods; the cylindrical housing is internally provided with a plurality of cells, which are penetrated by the connecting rods, at the inner wall along the axial direction; and the cells are respectively formed by cutting out a slot which is provided with a profiled stainless steel tubular inner wall.

7. The stainless steel motor with high weather resistance and high sealing performance according to claim 6, wherein one end of each of the connecting rods is in threaded connection with the front end cover, while the other end is provided with an end cap which is disposed at the outer wall of the bottom of the rear end cover; each of the connecting rods is sleeved with a thermal shrinkable tube and a sealing washer disposed between a corresponding end cap and the outer wall of the bottom of the rear end cover.

8. The stainless steel motor with high weather resistance and high sealing performance according to claim 7, wherein the rear end cover is provided with a plurality of inward recessing mounting bosses; the connecting rods correspond to the mounting bosses one by one and pass through the corresponding mounting bosses; the junction box comprises a stainless steel junction box base and a stainless steel junction cover fastened to the stainless steel junction box case; a junction box sealing ring is disposed between the stainless steel junction box base and the stainless steel junction cover; and the stainless steel junction box base is formed with a wire-wire hole and a wire-out plug disposed on the wire-out hole.

9. The stainless steel motor with high weather resistance and high sealing performance according to claim 1, wherein the rear end cover is internally provided with a centrifugal switch board and a centrifugal switch disposed on the centrifugal switch board; the rotor shaft is provided with a centrifuge, which can drive the centrifugal switch to close, at one end close to the rear end cover; and when the centrifuge is performing centrifugation, the centrifuge drives the centrifugal switch to open by the effect of the centrifugal force thereof; and a concession hole through which the rotor shaft passes is disposed in the central area of the centrifugal switch board.

10. The stainless steel motor with high weather resistance and high sealing performance according to claim 9, wherein the centrifugal switch is made of stainless steel plates, and the centrifugal switch board is fixed at the rear end cover through a plurality of connecting columns.

\* \* \* \* \*

UNITED STATES PATENT AND TRADEMARK OFFICE
CERTIFICATE OF CORRECTION

PATENT NO. : 10,361,602 B2
APPLICATION NO. : 15/311916
DATED : July 23, 2019
INVENTOR(S) : Guoyao Wu, Dong Chen and Fengping Zhou It is certified that error appears in the above-identified patent and that said Letters Patent is hereby corrected as shown below:

On the Title Page

Item (73), delete "Zhejiang Dongxin iTechnonlogy Co., Ltd., Zhuji (CN)" and insert -- Zhejiang Dongxin iTechnology Co., Ltd., Zhuji (CN) --, therefor.

Signed and Sealed this
Seventeenth Day of March, 2020

Andrei Iancu
*Director of the United States Patent and Trademark Office*